United States Patent
Lee

(10) Patent No.: US 6,523,086 B1
(45) Date of Patent: Feb. 18, 2003

(54) METHOD FOR IMPROVING PERFORMANCE OF READ CACHE OF MAGNETIC DISK DRIVE

(75) Inventor: Byung-Joon Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 683 days.

(21) Appl. No.: 08/958,844

(22) Filed: Oct. 28, 1997

(30) Foreign Application Priority Data

Oct. 28, 1996 (KR) .......................................... 96/49248

(51) Int. Cl.[7] .............................................. G06F 12/08
(52) U.S. Cl. ....................................... 711/113; 711/137
(58) Field of Search ................................. 711/113, 170, 711/171, 172, 173, 137; 710/56

(56) References Cited

U.S. PATENT DOCUMENTS 5,418,929 A * 5/1995 Tsuboi et al. ............... 711/171
5,600,817 A * 2/1997 Macon, Jr. et al. ......... 711/137
5,623,608 A * 4/1997 Ng .............................. 711/137
5,727,232 A * 3/1998 Iida et al. ...................... 710/56

* cited by examiner

*Primary Examiner*—Do Hyun Yoo
*Assistant Examiner*—Gary J. Portka
(74) *Attorney, Agent, or Firm*—Robert E. Bushnell, Esq.

(57) ABSTRACT

A method for improving the performance of a read cache of a magnetic disk drive includes: a data transmission process for reading corresponding data from the disk in response to a data read command of a host computer, temporarily storing the corresponding data in a constant unit storage region of a data transmission storage device, and transmitting the corresponding data to the host computer; a first read cache process for reading, from the disk, first data corresponding in size to the unit storage region and taken from a series of data after the corresponding data, and storing the first data in the unit storage region; and a second read cache process for reading, from the disk, second data corresponding in size to the unit storage region and taken from a series of data after the first data, and storing the second data in all other unit storage regions of the data transmission storage device.

13 Claims, 9 Drawing Sheets

METHOD FOR IMPROVING PERFORMANCE OF READ CACHE OF MAGNETIC DISK DRIVE

CLAIM FOR PRIORITY

This application makes reference to, incorporates the same herein, and claims all benefits accruing under 35 U.S.C. §119 from applications for METHOD FOR IMPROVING PERFORMANCE OF READ CACHE OF MAGNETIC DISK DRIVE earlier filed in the Korean Industrial Property Office on the Oct. 28, 1996, and there duly assigned Ser. No. 49248/1996, a copy of which application is annexed hereto.

BACKGROUND OF THE INVENTION

1. Technical Field

The present invention relates to a magnetic disk drive and, to a method for improving the performance of a read cache of a hard disk drive ("HDD" or "drive").

2. Related Art

Recent advances in microprocessors of computer systems and the user's demand for multimedia have precipitated the need for improved performance of auxiliary memory devices. Unfortunately, most auxiliary memory devices such as hard disk drives (HDD) available today are not able to process data at sufficient speed to satisfy the advance of microprocessors and the user's demand for multimedia. For this reason, performance improvements for input/output operations with auxiliary memory devices such as HDDs are in demand.

Contemporary efforts to increase the performance of the HDD are directed to hardware characteristics, such as improvement in the rotary speed of a spindle motor, the enlargement of a buffer random-access-memrnory (RAM), improvement in the search time, etc., in addition to software characteristics such as write cache, read cache, command recording such as disclosed in U.S. Pat. No. 4,425,615 for Hierarchical Memory System Having Cache/Disk Subsystem With Command Queues For Plural Disks issued to Swenson et al., U.S. Pat. No. 5,289,581 for Disk Driver With Lockahead Cache issued to Berenguel et al., U.S. Pat. No. 5,317,713 for Micro-Winchester Disk Drive Having On-Board Segmented Cache Memory issued to Glassburn, and U.S. Pat. No. 5,410,653 for Asynchronous Read-Ahead Disk Caching Using Multiple Disk I/O Processes And Dynamically Variable Prefetch Length issued to Macon, Jr. et al. Generally, HDD uses a data transfer rate to indicate the amount of data transmitted and received per unit time as the criteria for measuring its performance. As factors which affect the data transfer rate of the HDD, there are the rotary speed of the spindle motor, the moving speed of the actuator, the size of the buffer RAM, the efficiency of a driving program of the HDD, and the like.

There are two available techniques to increase the data transfer rate of the HDD. The first technique requires that, if the disk drive as the write cache receives a write command from the host computer, the disk drive stores data transmitted from the host computer in the buffer RAM and transmits a result before writing data on the disk to the host computer as if the write command had been performed. The disk drive then writes the data transmitted from the host computer in the buffer RAM during at spare time. A write cache operation uses a data transfer rate that is higher than a general write operation. The second technique of increasing the data transfer rate of the disk drive is to reduce data read time from the disk by previously storing demanded read data in the buffer RAM after the disk drive as the read clock carries out a data read command. A read cache operation also uses a data transfer rate that is higher than a general read operation.

Conventional read cache operation requires an entire storage region of the buffer RAM to be divided into segments, each having a constant size. In order to effectively manage the buffer RAM, the entire region of the buffer RAM which contains 512 sectors is divided into one or more logical units of the constant size, each being defined as a segment. If the number of the segments is small, a large quantity of data can be stored in the corresponding segment at a time when the host computer demands to read many sequential data. A disadvantage is that, if the host computer demands to read a small quantity of data many times, all the data cannot be stored in the buffer RAM. If the number of the segments is large, however, the advantage and disadvantage are contrary to the case when the number of the segments is small. For this reason, the number of the segments of the buffer RAM must be set appropriately in order to maximize the read cache operation.

In addition, the amount of data which is read in advance depends upon whether the size of data demanded by the host computer is smaller than the size of one segment. If the size of data demanded by the host computer is smaller than the size of the segment of the buffer RAM, the read cache operation is performed and data which is read in advance exists. However, if the size of data demanded by the host computer is equal to or greater than the size of the segment of the buffer RAM, the read cache operation cannot be implemented. Such a conventional read cache operation cannot erase data stored in the corresponding segment of the buffer RAM when the host computer again demands to read the data which has been transmitted to the host computer by the read command. Moreover, most computer systems use an operating system (OS) relying on its own cache region, which is much larger than the HDD, to perform the read cache operation. Consequently, the possibility that the data demanded by the host computer is again read by the host computer is lower than the possibility that the data read-cached by the previous read command is read. That is, the host computer directly reads data read by the previous read command from its own read cache. Therefore, the conventional read cache technique for maintaining the data stored in the segment of the buffer RAM after the data is transmitted to the host computer to reduce the amount of the read cache is not useful for the improvement in the performance of the disk drive. Further, if the data read by the host computer is filled in one segment, and the read cache operation is not performed, the conventional read cache technique is not effective for the improvement in the performance of the disk drive.

SUMMARY OF THE INVENTION

Accordingly, it is therefore an object of the present invention to provide a read cache method for improving the efficiency and performance of a disk drive.

It is another object of the present invention to provide a read cache method for increasing a data transfer rate between a disk drive and a host computer.

It is still another object of the present invention to provide a read cache method for effectively using a transfer data storage region of a disk drive.

It is still yet another object of the present invention to provide a read cache method for increasing a data transfer rate between a disk drive and a host computer without additional hardware.

These and other objects of the present invention can be achieved by a method for improving the efficiency and performance of a disk cache of a disk drive which includes a data transmission process for reading corresponding data from the disk in response to a data read command of a host computer, temporarily storing the corresponding data in a constant unit storage region of a data transmission storage device, and transmitting the corresponding data to the host computer; a first read cache process for reading, from the disk, first data corresponding to the size of the unit storage region among a series of data after the corresponding data, and storing the first data in the unit storage region; and a second read cache process for reading, from the disk, second data corresponding to the size of the unit storage region among a series of data after the first data, and storing the second data in all other unit storage regions of the data transmission storage device.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
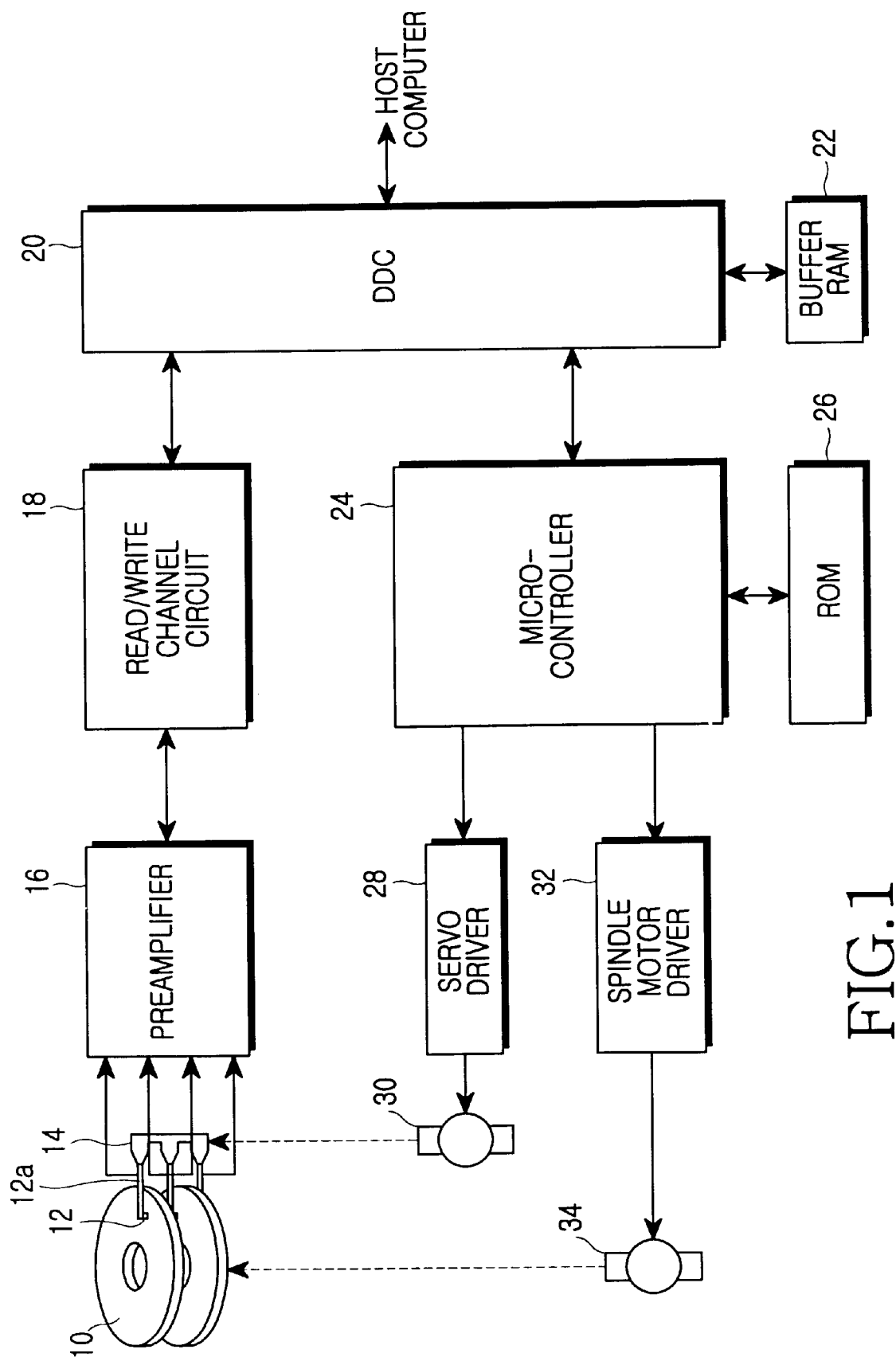
FIG. 1 is a block diagram of a hard disk drive (HDD)

Referring now to the drawings, FIG. 1, illustrates a typical hard disk drive (HDD). The HDD includes magnetic disks 10, a transducer head assembly 14 of an E-shape having actuator arms such as actuator arm 12a, each for supporting a respective transducer head 12, a preamplifier 16, a read/write channel circuit 18, a disk data controller (DDC) 20, a buffer random-access-memory (RAM) 22, a micro-controller 24, a read-only-memory (ROM) 26, a servo driver 28 for driving a voice coil actuator or a voice coil motor (VCM) 30 and a spindle motor driver 32 for driving a spindle motor 44.

Preamplifier 16 is electrically connected to transducer head assembly 14 for amplifying a predetermined signal read out from the disk 10 using the transducer head 12, and transmitting the amplified signal to the read/write channel circuit 18 during a read operation. For the purpose of writing data onto the disk 10, the preamplifier 16 applies encoded writing data transmitted from the read/write channel circuit 18 to a designated transducer head 12 from all available transducer heads to be recorded on the disk 10. At this time, the preamplifier 16 selects one of the transducer heads 12 according to a control signal generated by disk data controller (DDC) 20 under the instruction of micro-controller 24.

Read/write channel circuit 18 is connected between the preamplifier 16 and the DDC 20 for decoding data pulses from a read signal received from pre-amplifier 16 to generate read-out data, and for decoding write data received from DDC 20 to transmit the decoded write data to the pre-amplifier 16. DDC 20, which is interfaced between a host computer 40 and micro-controller 24, writes data received from the host computer 40 on disk 10 through the read/write channel circuit 18 and pre-amplifier 16, or reads data from the disk 10 and transmits the same to the host computer 40 under control of the micro-controller 24. A buffer RAM 22 temporarily stores data transmitted between the host computer 40, micro-controller 24, and read/write channel circuit 18. Micro-controller 24 controls DDC 20 in response to read or write commands received from the host computer 40, and controls track seeking and following operations. ROM 26 stores the system control program used by micro-controller 24 and various set points. According to a signal which is generated by micro-controller 24 for controlling the position of head 12, servo driver 28 generates current for moving the actuator arm 12a and applies the current to VCM 30. VCM 30 moves head 12 attached to the actuator arm 12a over disk 10 corresponding to the direction and level of the current applied by the servo driver 28. A spindle motor driver 32 operates a spindle motor 34 which rotates disk 10 according to a value generated by micro-controller 24 for controlling the rotation of the disk 10. A disk signal control unit (not shown) generates various kinds of timing signals necessary to read and write, and sends servo information to the micro-controller 24 after decoding the information.

Since advanced computer systems are expected to include an HDD with higher speed and more capacity, efforts have been made to increase the performance of the HDD in terms of hardware characteristics such as the rotary speed of the spindle motor 34, the enlargement of the buffer RAM 22, the search time, etc., in addition to software characteristics such as write cache, read cache, command recording, etc. The HDD uses a data transfer rate indicating the amount of data transmitted and received per unit time as the criteria for measuring its performance. As factors which affect the data transfer rate of the HDD, there are the rotary speed of the spindle motor 34, the moving speed of the VCM 30, the size of the buffer RAM 22, the efficiency of a driving program of the HDD, and the like.

There are two available techniques to increase the data transfer rate of the HDD. The first technique requires that, if the disk drive as the write cache receives a write command from the host computer 40, the disk drive stores data transmitted from the host computer 40 in the buffer RAM 22 and transmits a result, before writing data on the disk, to the host computer 40 as if the write command had been performed. The drive writes the data transmitted from the host computer 40 in the buffer RAM 22 during spare time. It will be appreciated that a write cache operation is higher than a general write operation in terms of the data transfer rate.

Figure 2A:
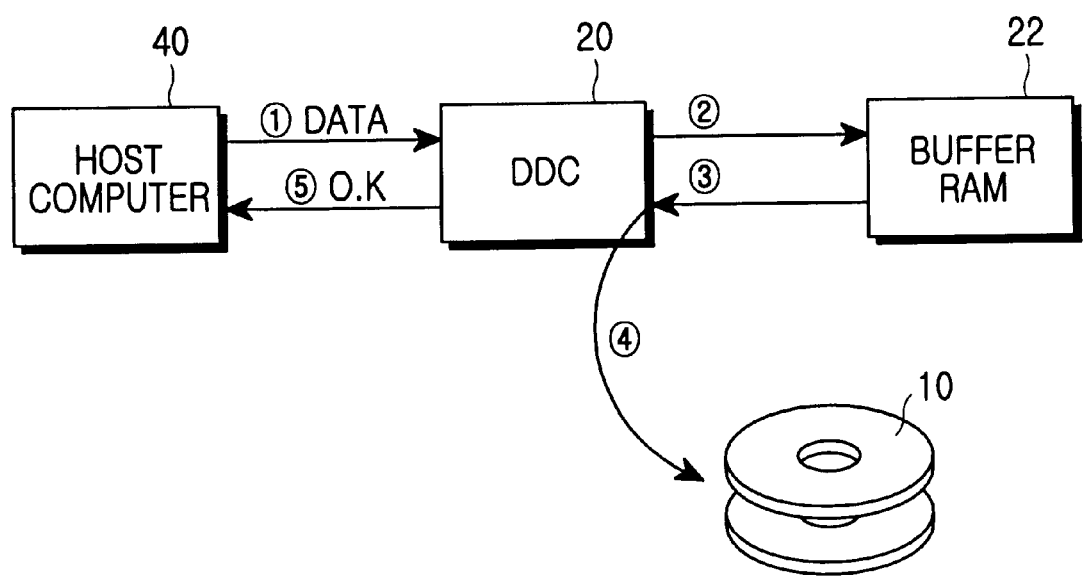
FIG. 2A is a diagram of a general write operation of the HDD.
Figure 2B:
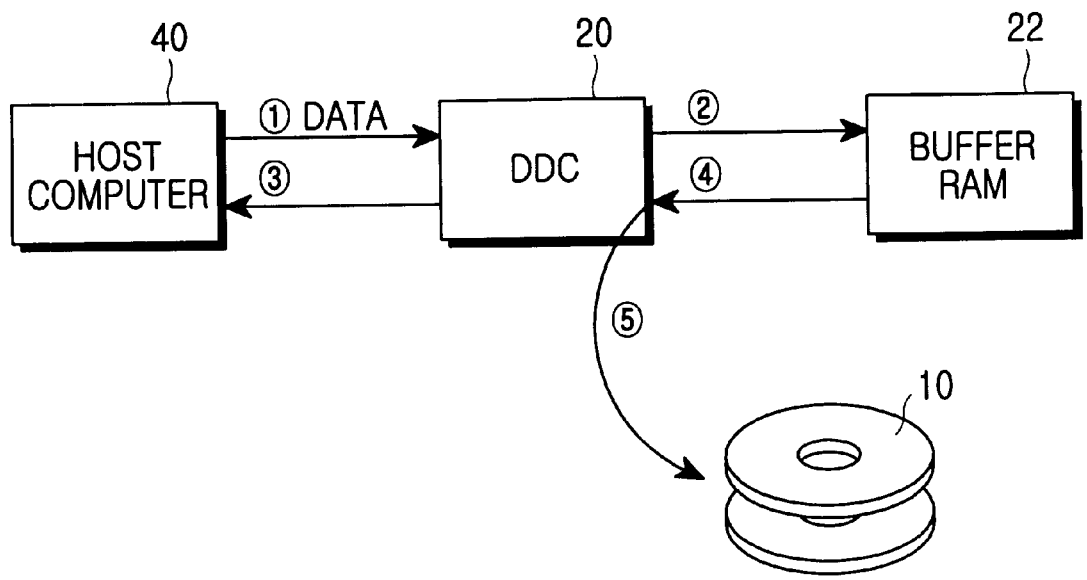
FIG. 2B is a diagram of a write cache operation of the HDD.

FIG. 2A illustrates the general write operation, and FIG. 2B illustrates the write cache operation. Referring to FIG. 2A, if the host computer 40 transmits data and a data write command to the DDC 20 of the disk drive (1), the DDC 20 stores the data transmitted from the host computer 40 in the buffer RAM 22 (2) and then reads out the data (3). The DDC 20 writes the data in the disk 10 (4) and informs the host computer 40 that the data write operation has been terminated (5). Referring to FIG. 2B, if the host computer 40 transmits the data and the data write command to the DDC 20 (1), the DDC 20 stores the data transmitted from the host computer 40 in the buffer RAM 22 (2) and informs the host computer 40 that the data write operation has been terminated (3). The DDC 20 then reads out the data transmitted from the host computer 40 from the buffer RAM 22 (4) during spare time and writes the data in the disk 10 (5).

Figure 3A:
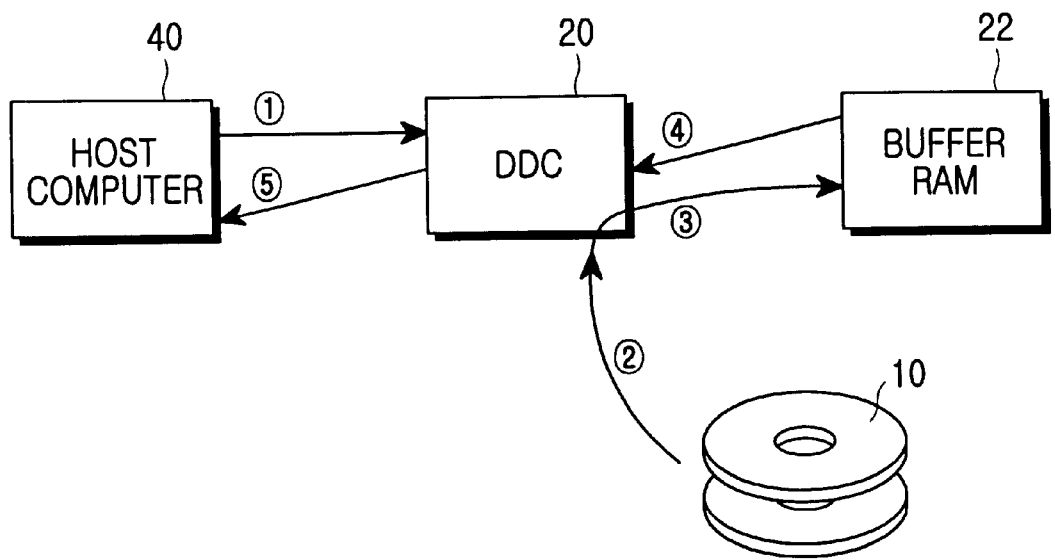
FIG. 3A is a diagram of a general read operation of the HDD.
Figure 3B:
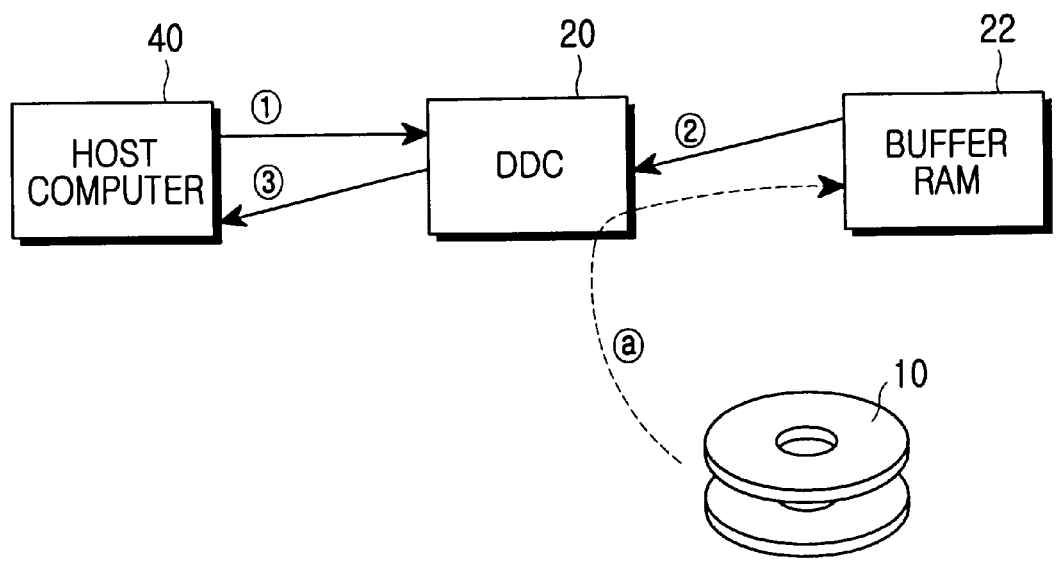
FIG. 3B is a diagram of a read cache operation of the HDD.

A second technique for increasing the data transfer rate of the drive is to reduce data read time from the disk by previously storing demanded read data in the buffer RAM 22 after the drive as the read clock carries out a data read command. A read cache operation is higher than a general read operation in the terms of data transfer rate. FIG. 3A illustrates the general read operation, and FIG. 3B illustrates the read cache operation. Referring to FIG. 3A, if the host computer 40 transmits data and a data read command to the DDC 20 of the disk drive (1), the DDC 20 reads corresponding data from the disk 10 (2) and temporarily stores the data in the buffer RAM 22 (3). The DDC 20 again reads the data from the buffer RAM 22 (4) and transmits the data to the host computer 40 (5). Referring to FIG. 3B, the DDC 20 reads data to be requested after a previous read command of the host computer 40 is performed, and stores the data in the buffer RAM 22 (a). If the host computer 40 transmits the data read command to the DDC 20 (1), the DDC 20 reads the data (which should be equal to the data of the read command) stored in the buffer RAM 22 (2) and directly transmits the data to the host computer 40 (3).

As shown in FIGS. 2A, 2B, 3A and 3B, the data read and write speed from the host computer to the disk drive becomes faster by virtue of the read cache or write cache operation.

Figure 4A:
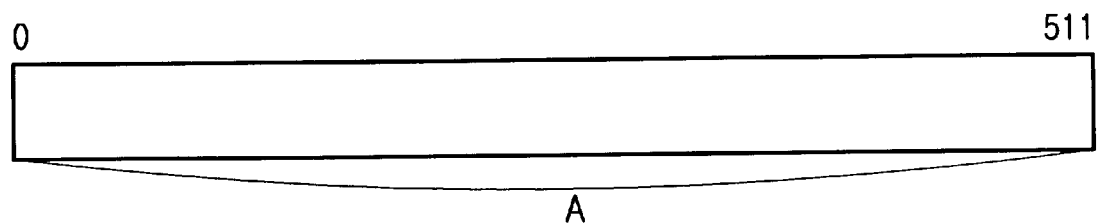
FIG. 4A illustrates one example of a storage region of a buffer RAM divided into one segment.
Figure 4B:
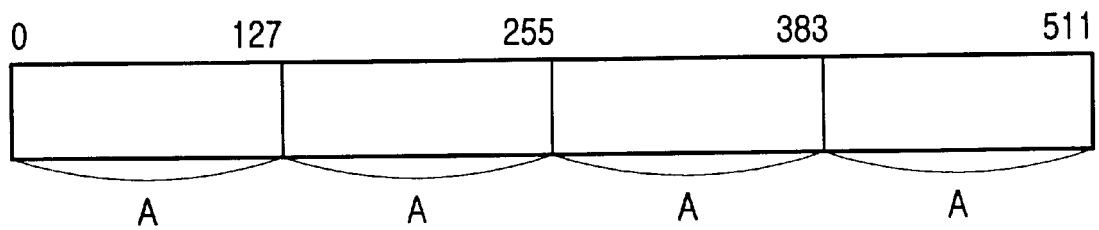
FIG. 4B illustrates another example of the storage region of the buffer RAM divided into four (4) segments.

The conventional read cache will now be described in detail with reference to FIGS. 1, 3A, 3B, 4A, 4B and 5. As shown in FIGS. 4A and 4B, an entire storage region of the buffer RAM 22 is divided into segments each having a constant size A. In order to effectively manage the buffer RAM 22, the entire region of the buffer RAM 22 is divided into the logical unit of the constant size A, and in this case, each unit region is defined as the segment. It is assumed that the entire region of the buffer RAM 22 has 512 sectors. FIG. 4A shows an example defining the entire storage region of the buffer RAM 22 as one segment (in this case, the size A of one segment is 512 sectors), and FIG. 4B shows another example defining the entire storage region of the buffer RAM 22 as 4 segments (in this case, the size A of one segment is 128 sectors). There are advantages and disadvantages that are associated with the number of the segments which constitute the entire storage region.

For example, if the number of the segments is small, a large quantity of data can be stored in the corresponding segment at a time when the host computer 40 demands to read many sequential data. A disadvantage is that if the host computer 40 demands to read a small quantity of data many times, all the data can not be stored in the buffer RAM 22. As shown in FIG. 4A, if the host computer 40 demands to read data of about 400 sectors, the DDC 200 reads corresponding data from the disk 10 and stores the corresponding data in one segment (512 sectors) at a time. The read cache for data of other 112 sectors is simultaneously performed. Thereafter, if there is the read command for data (including the data read by the read cache) stored in the segment, the DDC 20 directly reads the data from the segment of the buffer RAM 22 instead of reading the data from the disk 10. The disadvantage is that, if the host computer 40 demands to read data of about 50 sectors, the DDC 20 reads corresponding data from the disk 10 and stores the corresponding data in the segment (512 sectors) of the buffer RAM 22. Thereafter, if the host computer 40 demands to read another data, the DDC 20 reads corresponding data from the disk 10 and overwrites the corresponding data in that segment. Therefore, the previous data is erased.

If the number of the segments is large, the advantage and disadvantages are contrary to the case when the number of the segments is small. Referring to FIG. 4B, if the host computer 40 demands to read data of about 50 sectors, the DDC 20 reads corresponding data from the disk 10 and stores the data in the first segment (128 sectors) of the buffer RAM 22. At the same time, the read cache for other data of the segment is performed. Therefore, if the host computer 40 demands to read another data, the DDC 20 reads corresponding data from the disk 10 and stores the data in the second segment of the buffer RAM 22. The read cache for other data of the segment is also performed. Hence, each segment of the buffer RAM 22 can store all the randomly read data. The disadvantage is that, if the host computer 40 demands to read data of about 400 sectors, the DDC 20 reads corresponding data from the disk 10 and stores the data in one empty segment (128 sectors) at a time. Therefore, data is overwritten in the corresponding segment by three times. Then the read cache is not executed. The overwritten data is not useful for the next use. Consequently, the number of the segments of the buffer RAM 22 must be set appropriately to maximize the read cache operation.

Figure 5:
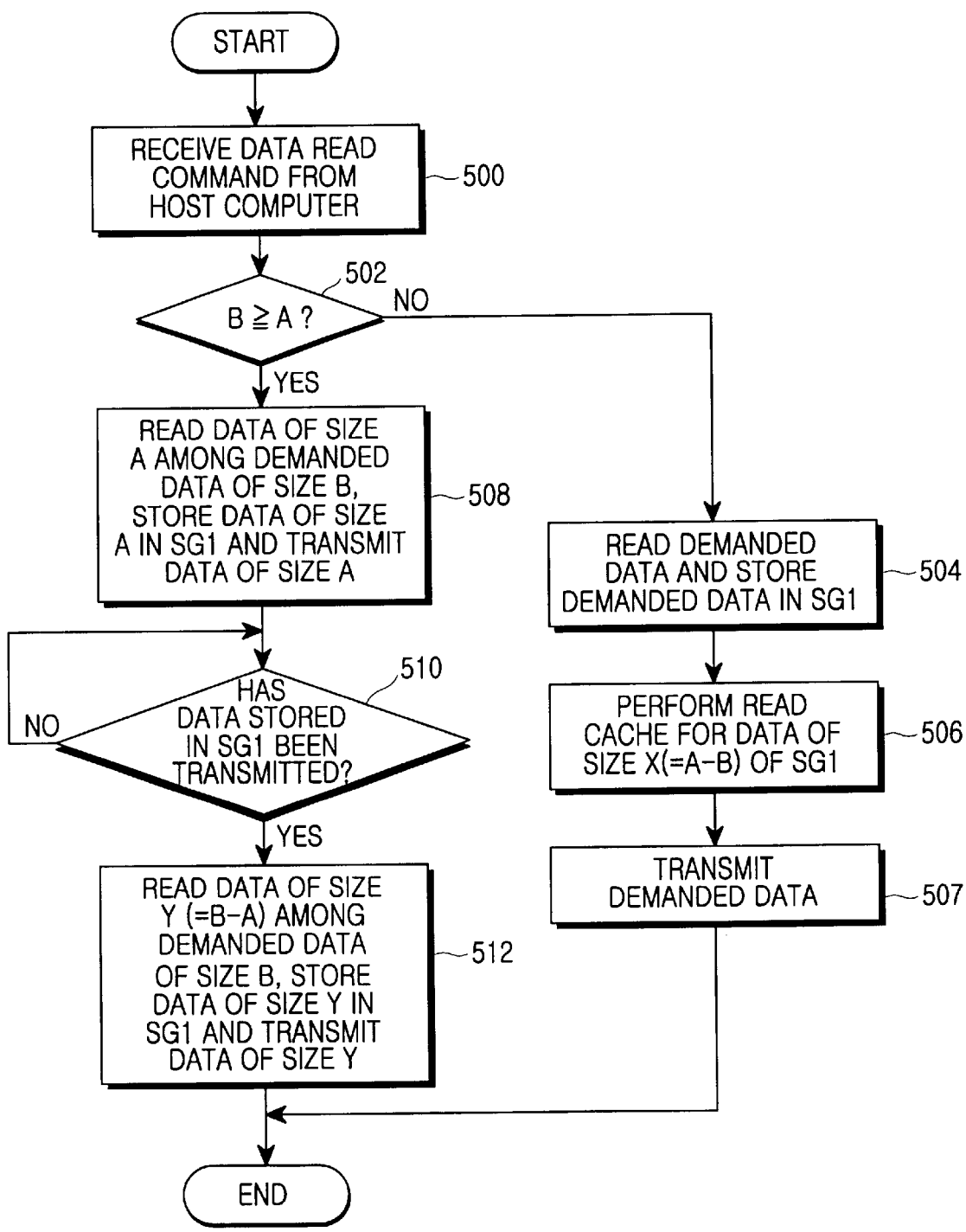
FIG. 5 is a flow chart of a read cache operation of the HDD.
Figure 6:
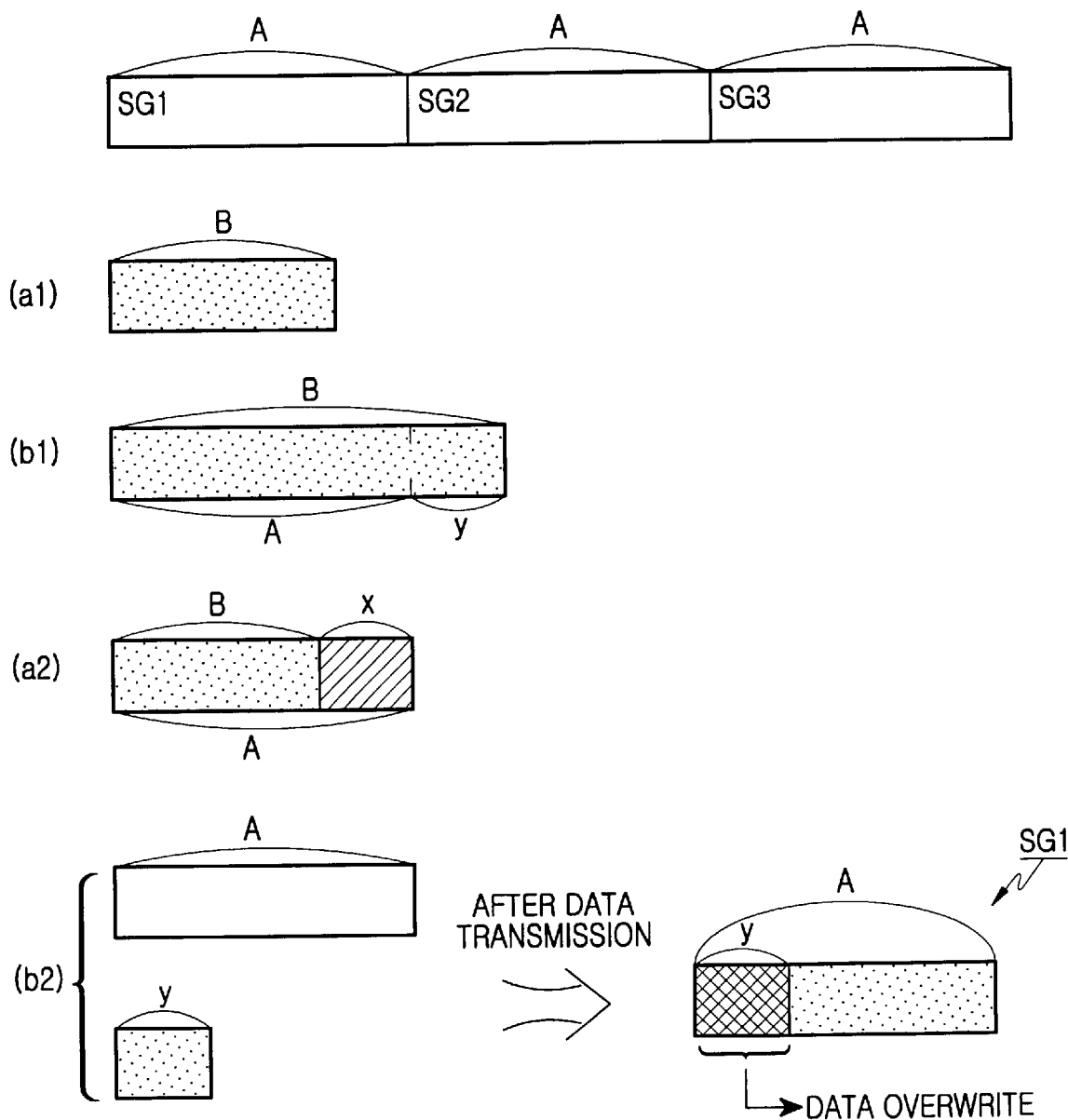
FIG. 6 illustrates the state of a segment of a buffer RAM of the HDD.

FIG. 5 is a flow chart of the contemporary read cache operation of the HDD, and FIG. 6 shows the state of the segment of the buffer RAM 22. As shown in FIG. 6, the buffer RAM 22 is divided into 3 segments SG1, SG2 and SG3. Parameter "A" indicates the size of each segment, and parameter "B" designates the size of data demanded by the host computer 40. In operation, if the host computer 40 transmits a data read command, the DDC 20 recognizes this at step 500. The DDC 20 then determines whether the size B of data demanded by the host computer 40 is equal to or greater than the size A of the segment of the buffer RAM 22 at step 502. In FIG. 6, (a1) shows the case where the size B of the data demanded by the host computer 40 is less than the size A of the segment, and (a2) shows the case where the size B of the data demanded by the host computer 40 is equal to or greater than the size A of the segment.

If B<A (which corresponds to (a1) of FIG. 6), the DDC 20 reads the demanded data of size B from the disk 10 and stores the data in a first segment SG1 of the buffer RAM 22 at step 504. At step 506, the DDC 20 reads data of size x (=A−B) and stores the data in the first segment SG1. Namely, the read cache for the data of size x is performed. The read-cached data is data following the last sector of the demanded data. At step 507, the DDC 20 reads the demanded data from the first segment SGI of the buffer RAM 22 at read timing of the host computer 40, and transmits the demanded data to the host computer 40. In FIG. 6, (a2) illustrates data stored in the first segment SG1 after the demanded data is transmitted. In the first segment SG1, the data of size B demanded by the host computer 40 and the read-cached data of size x (=A−B) are stored.

If the size B of data demanded by the host computer 40 is equal to or greater than the size A of the segment of the buffer RAM 22 at step 502, the DDC 20 reads data of the size A among the demanded data of the size B from the disk 10 and stores the data of the size A in the first segment SGI of the buffer RAM 22 at step 508. The DDC 20 reads the data of the first segment SG1 and transmits the data to the host computer 40. At step 510, the DDC 20 then determines whether the data stored in the first segment SGI has been transmitted. If the data stored in the first segment SG1 has been transmitted, the DDC 20 reads data of size y (=B−A) from the disk 10 and stores the data in the first segment SG1 of the buffer RAM 22, at step 512. The DDC 20 reads the data and transmits the data to the host computer 40 at the read timing of the host computer 40. In FIG. 6, (b2) shows the data stored in the first segment SG1 after the demanded data is transmitted. The data of size y among the data of size B demanded by the host computer 40 is overwritten into the segment SG1. Therefore, the data corresponding to the overwritten data is erased. The second and third segments SG2 and SG3 are used for storing data read from the disk 10 by another read command of the host computer 40.

In the contemporary read cache technique, the amount of data which is read in advance depends on whether or not the data of size B demanded by the one command is smaller than the size A of one segment. If B<A, the read cache is performed and data which is read in advance exists. However, if B≧A, the read cache is not implemented. Such a convention read cache technique cannot erase data stored in the corresponding segment of the buffer RAM 22 when the host computer again demands to read the data of size B which has been transmitted to the host computer by the read command.

Moreover, recent computer systems use an operating system (OS) that has its own cache region much larger than the HDD to perform the read cache similar to that performed in the HDD. Consequently, the possibility that the data demanded by the host computer is again read by the host computer is lower than the possibility that the data read-cached by the previous read command is read. That is, the host computer directly reads data read by the previous read command from its own read cache. Therefore, the read cache technique for maintaining the previous data in the segment of the buffer RAM after the data is transmitted to the host computer to reduce the amount of the read cache is not useful for the improvement in the performance of the disk drive. Further, if the data read by the host computer is filled in one segment, since the read cache is not performed, the contemporary read cache technique is not effective for the improvement in the performance of the disk drive. In addition, data maintenance read by the disk drive is also inefficient since the operating system used in computer systems has a cache region that is much larger than the disk drive. Therefore, it is effective that the region (a segment unit) of the buffer RAM used to store data demanded by the host computer is not utilized for the read cache data if the transmission of the data is terminated.

Figure 7A:
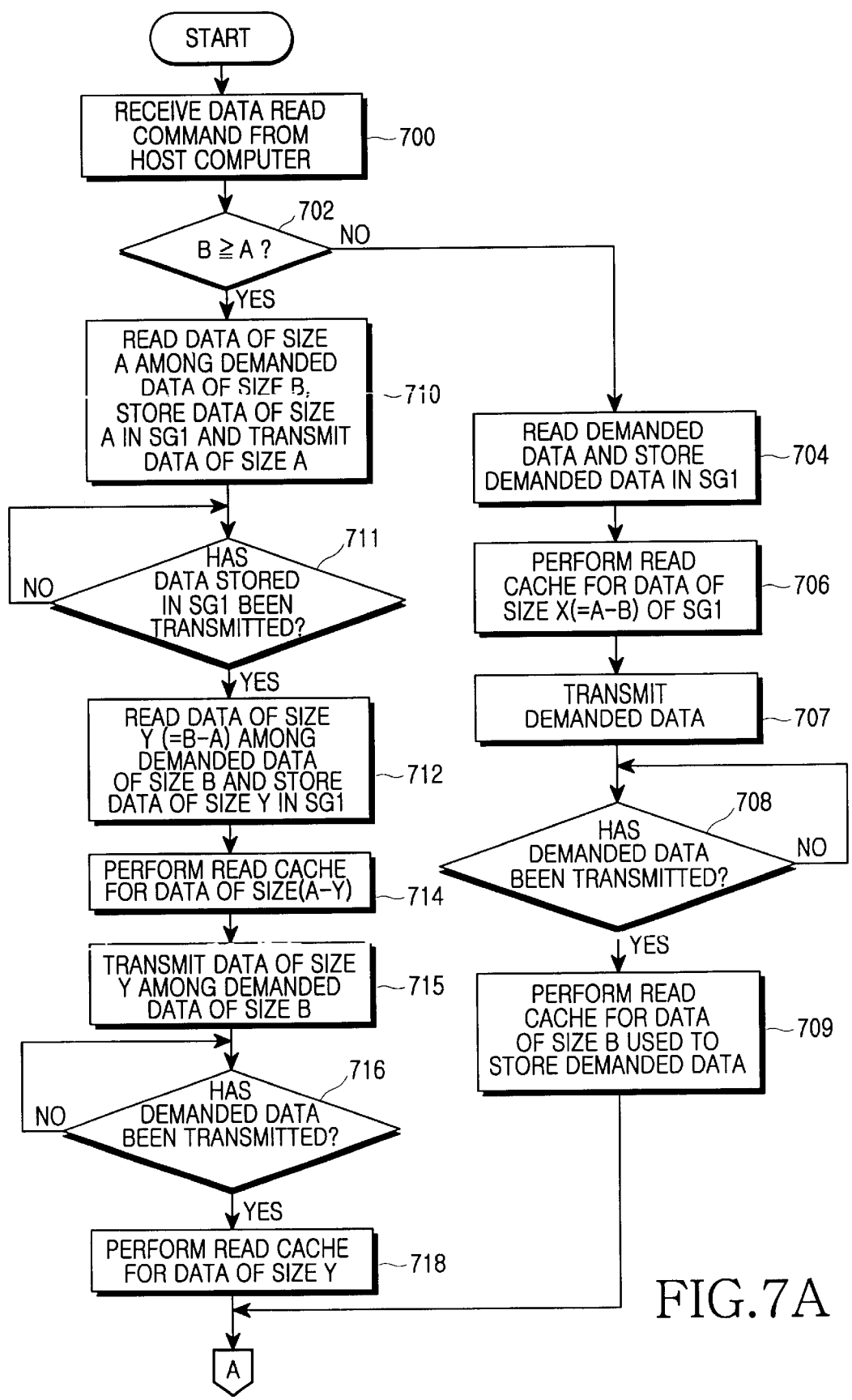
FIGS. 7A and 7B are flow charts of a read cache operation according to the principles of the present invention.
Figure 7B:
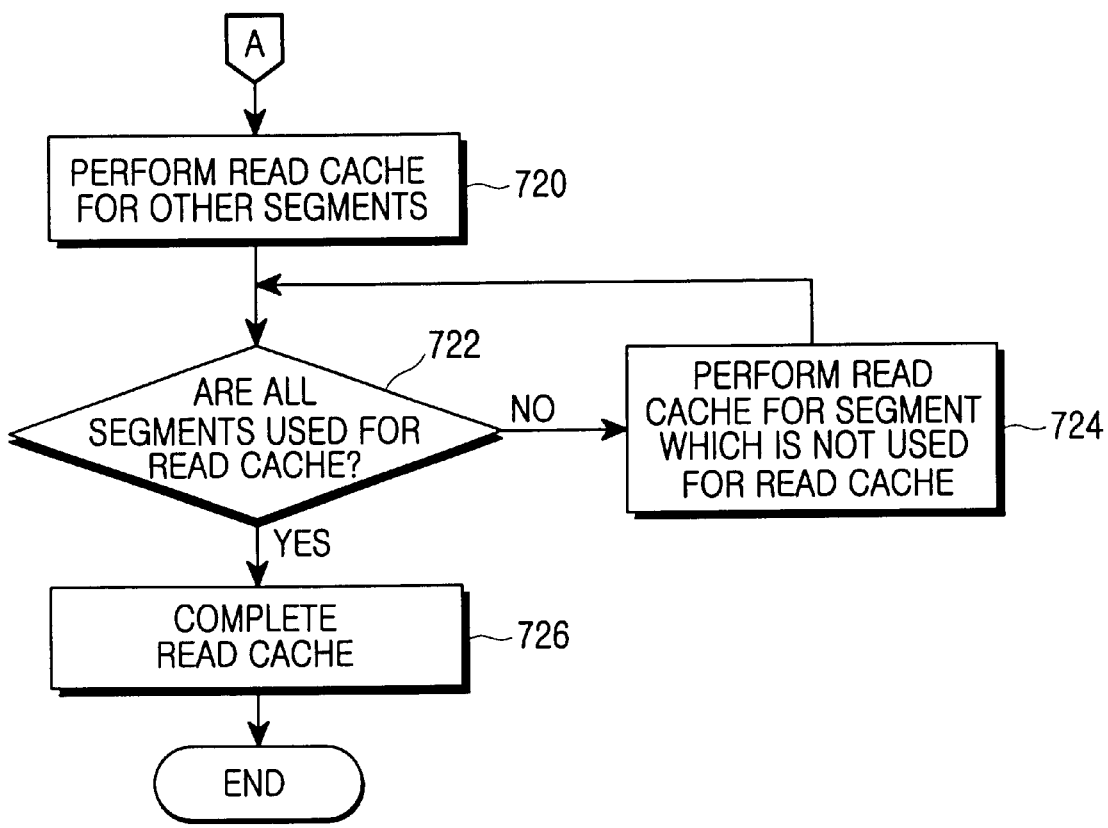
Figure 8:
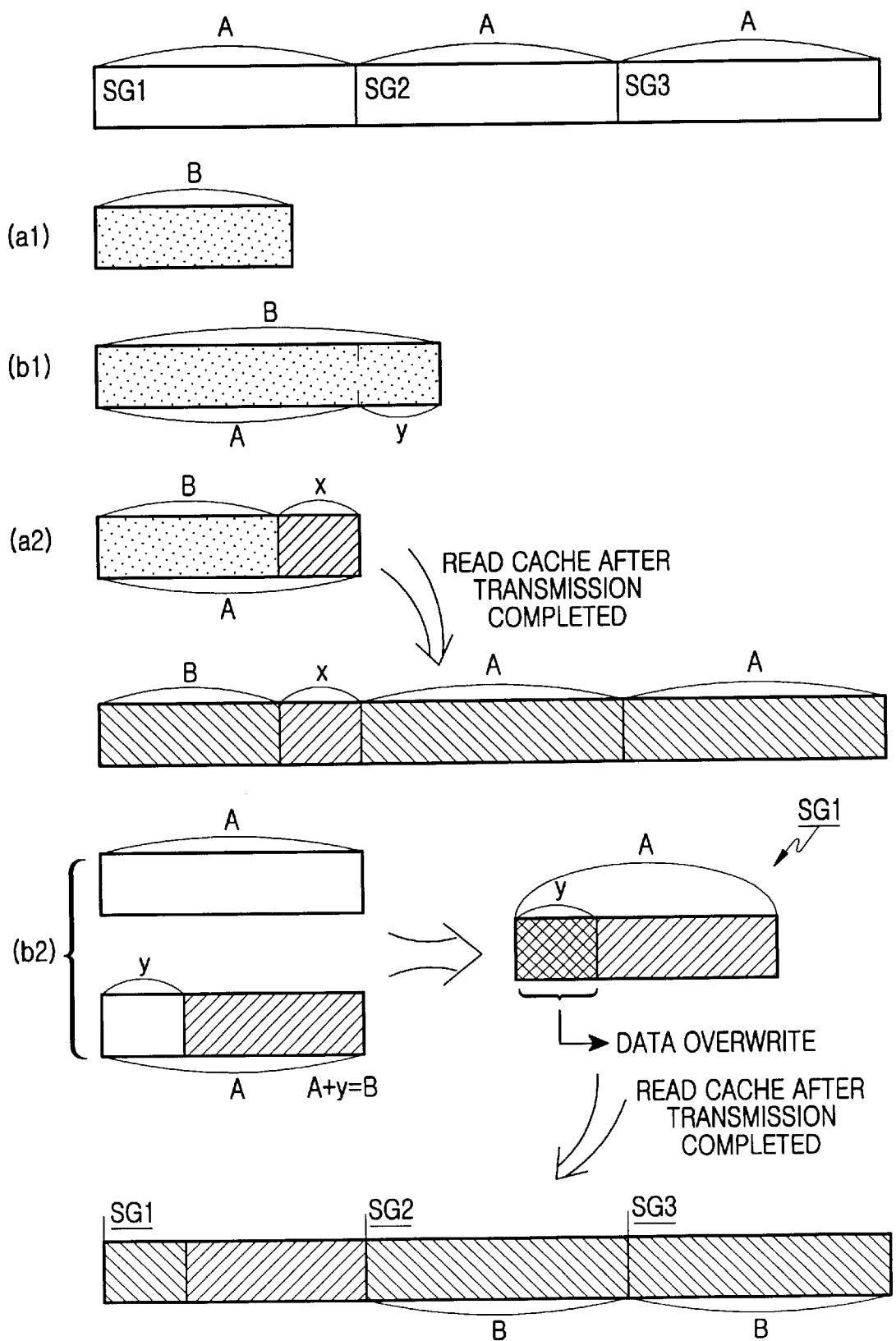
FIG. 8 illustrates the state of a segment of the buffer RAM according to the principles of the present invention.

Turning now to FIGS. 7A and 7B which illustrate a read cache operation according to the principles of the present invention, and FIG. 8 which shows the state of the buffer RAM according to the present invention. Referring to FIG. 8, the storage region of the buffer RAM 22 is classified into 3 segments SG1, SG2 and SG3. Parameter "A" indicates the size of each segment of the buffer RAM 22, and parameter "B" designates the size of data demanded by the host computer 40.

In operation, if the host computer 40 transmits a data read command, the DDC 20 recognizes this at step 700 shown in FIG. 7A. At step 702, the DDC 20 determines whether the size B of data demanded by the host computer 40 is equal to or greater than the size A of the segment of the buffer RAM 22. In FIG. 8, (a1) shows the case where the size B of the data demanded by the host computer 40 is less than size A of the segment of the buffer RAM 22 (that is, B<A), and (a2) shows the case where size B of the data demanded by the host computer 40 is equal to or greater than size A of the segment of the buffer RAM 22 (that is, B≧A).

If B<A (this corresponds to (a1) in FIG. 8), the DDC 20 reads demanded data of size B from the disk 10 and stores the data in the first segment SGI of the buffer RAM 22, at step 704. At step 706, data corresponding to size x (=A−B) is read and stored in the first segment SGI. Namely, the read cache for the data corresponding to the size x is performed. The read-cached data is a series of data following the last sector of the demanded data. At step 707, the DDC 20 reads the demanded data of size B from the first segment SG1 of the buffer RAM 22 at the read timing of the host computer 40 and transmits the demanded data to the host computer 40. The first construction of (a2) of FIG. 8 illustrates data stored in the first segment SG1 after the demanded data is transmitted. In the first segment SG1, the data demanded by the host computer 40 and the read-cached data of the size x (=A−B) are stored.

At step 708, the DDC 20 determines whether the demanded data has been transmitted. If the demanded data has been transmitted, the DDC 20 reads data corresponding to size B used to store the demanded data from the disk 10. In this case, the data read from the disk 10 is a series of data after the last sector of the read-cached data before the demanded data is transmitted. At step 720, the data read cache for other segments SG2 and SG3 is implemented. The data stored in the segments SG2 and SG3 by the read cache is a series of data after the last sector of the read-cached data after the demanded data is transmitted. At step 722, a determination is made as to whether or not all the segments are used for the read cache is checked. If not, the read cache for the segment which is not used for the read cache is performed at step 724. If all the segments of the buffer RAM 22 are used for the read cache, the read cache is completed at step 726. As shown in the second construction of (a2) of FIG. 8, all the segments of the buffer RAM 22 are used for the read cache operation.

If size B of data demanded by the host computer 40 is equal to or greater than size A of the segment of the buffer RAM 22 (this corresponds to (b1) of FIG. 8) at step 702, the DDC 20 reads data of size A among demanded data of size B, stores the data in the first segment SG1 of the buffer RAM 22 and transmits the data of the first segment SG1 to the host computer 40 at read timing of the host computer 40, at step 710. At step 711, a determination is made as to whether or not all the data stored in the first segment SG1 has been transmitted is checked. If yes, the DDC 20 reads data of a size y (=B−A) from the disk 10 and stores the first segment SG1 of the buffer RAM 22, at step 712. At step 714, the read cache for region (A−y) of the segment SGI which is not overwritten is performed. The data stored in the region (A−y) of the segments SGI is a series of data after the last sector of the data demanded by the host computer 40. The second construction of (b2) of FIG. 8 shows the data stored in the first segment SGI before the data of the size y among the demanded data is transmitted. In the first segment SG1, the data corresponding to the size y (=B−A) is overwritten and the read-cached data is stored in a region (A−y).

At step 715, the DDC 20 reads data of size y among the demanded data from the segment SG1 and transmits the data of size y to the host computer 40. At step 716, the DDC 20 determines whether the demanded data has been transmitted. If the demanded data has been transmitted, the DDC 20 reads, at step 718, data corresponding to size y from the disk 10. The data read from the disk 10 is a series of data after the last sector of the read-cached data before the demanded data is transmitted. At step 720, the DDC 20 performs the data read cache for other segments SG2 and SG3. The data stored in the segments SG2 and SG3 is a series of data after the last sector of the read-cached data after the demanded data is transmitted. At step 722, a determination is made as to whether or not all the segments are used for the read cache. If not, the read cache for the segment which is not used for the read cache is performed at step 724. If all the segments of the buffer RAM 22 are used for the read cache, the read cache is completed at step 726. As shown in the third construction of (b2) of FIG. 8, all the segments of the buffer RAM 22 are used for the read cache.

The efficiency of the read cache of the HDD is represented by a hit ratio HR, that is, by the ratio of data demanded by the read command of the host computer 40 to data existing in the buffer RAM 22. This can be expressed by the following equation:

$$HR = \text{data existing in buffer RAM within demanded data}/\text{demanded data}$$

The higher the hit ratio HR is, the higher data transfer rate between the host computer 40 and the HDD becomes. That is, if the hit ratio HR increases, the data demanded by the host computer 40 is previously read from the disk 10 and stored in the buffer RAM 22. Therefore, the desired data can be directly transmitted to the host computer 40 without consuming time to read data from the disk 10. When all using the buffer RAM 22 as the read cache, the microcontroller 24 reads the data demanded by the host computer 40 from the disk 10 and shifts the head 12 to the next position of the last sector to provide for the data read command from the next region of the last sector of the demanded sector. If it is necessary to search the next position of the last sector, the microcontroller performs a search in advance. Such a servo control operation of the microcontroller 24 can reduce additional overhead caused by the read cache.

As described above, since the buffer RAM is used for the read cache after data is transmitted, the data transfer rate between the HDD and the host computer is faster. The data transfer rate is raised without addition hardware cost and thereby improves the performance of the disk drive.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for improving performance of a read cache of a disk drive, comprising:

a data transmission process for reading corresponding data from a disk in response to a data read command of a host computer, temporarily storing said corresponding data in a constant unit storage region of a data transmission storage device, and transmitting said corresponding data to said host computer;

a first read cache process for reading, from said disk, first data corresponding in size to said constant unit storage region and taken from a series of data after said corresponding data, and storing said first data in said constant unit storage region; and a second read cache process for reading, from said disk, second data corresponding in size to a multiple of said constant unit storage regions and taken from a series of data after said first data, and storing said second data in all other constant unit storage regions of said data transmission storage device.

2. The method of claim 1, further comprising shifting a head to a position of data to be read-cached before said first and second read cache processes are performed.

3. A method for improving performance of a read cache when a size of data demanded by a data read command of a host computer is less than a unit storage region of a data transmission storage device within a disk drive, said method comprising the steps of:

reading corresponding data from said disk in response to said data read command from said host computer, and temporarily storing said corresponding data in partial region of said unit storage region of said data transmission storage device;

reading, from said disk, a first series of data after said corresponding data, storing said first series of data in a spare region of said unit storage region in which said corresponding data is stored, and transmitting said corresponding data to said host computer;

reading, from said disk, a second series of data corresponding in size to said partial region of said unit storage region and taken from data after said first series of data, and storing said second series of data in said partial region of said unit storage region; and reading, from said disk, a third series of data after said second series of data stored in said partial region of said unit storage region, and storing said third series of data in all other unit storage regions within said data transmission storage device.

4. The method of claim 3, further comprising shifting a head to a position of data to be read-cached before the read cache is performed.

5. The method of claim 1, said data transmission storage device comprising a buffer random-access-memory serving as a cache for said disk drive.

6. A method for improving performance of a read cache when a size of data demanded by a data read command of a host computer is larger than a unit storage region of a data transmission storage device within a disk drive, said method comprising the steps of:

reading, from said disk, first data corresponding in size to said unit storage region and taken from corresponding data demanded by said host computer in response to said data read command, temporarily storing said first data in said unit storage region of said data transmission storage device, and transmitting said first data to said host computer;

reading, from said disk, second data comprising all data not included in said first data and taken from said corresponding data, and storing said second data in a partial region of said unit storage region;

reading, from said disk, a first series of data after said corresponding data, and storing said first series of data in a spare region of said unit storage region in which said second data is stored;

transmitting said second data to said host computer; and reading, from said disk, a second series of data after said first series of data stored in said spare region of said unit storage region, and storing said second series of data in said partial region of said unit storage region.

7. The method of claim 6, further comprising reading, from said disk, a third series of data after said second series of data stored in said partial region of said unit storage region, and storing said third series of data in all other unit storage regions.

8. The method of claim 7, further comprising shifting a head to a position of data to be read-cached before the read cache is performed.

9. The method of claim 8, said data transmission storage device comprising a buffer random-access-memory serving as a cache of said disk drive.

10. A method for improving performance of a read cache of a disk drive, comprising:

a first read cache process implemented when a size of data demanded by a data read command of a host computer is smaller than a unit storage region of a data transmission storage device within said disk drive, said first read cache process comprising the steps of:

reading corresponding data from a disk in response to said data read command from said host computer, and temporarily storing said corresponding data in a partial region of said unit storage region of said data transmission storage device, reading, from said disk, a first series of data after said corresponding data, and storing said first series of data in a spare region of said unit storage region in which said corresponding data is stored, transmitting said corresponding data to said host computer, reading, from said disk, a second series of data after said first series of data stored in said spare region of said unit storage region, and storing said second series of data in said partial region of said unit storage region, and reading, from said disk, a third series of data after said second series of data stored in said partial region of said unit storage region, and storing said third series of data in all other unit storage regions; and a second read cache process alternatively implemented when the size of data demanded by said data read command of said host computer is larger than said unit storage region of said data transmission storage device, said second read cache process comprising the steps of:

reading, from said disk, first data corresponding in size to said unit storage region and taken from corresponding data demanded by said host computer in response to said data read command, temporarily storing said first data in said unit storage region of said data transmission storage device, and transmitting said first data to said host computer, reading, from said disk, second data comprising all data not included in said first data and taken from said corresponding data, and storing said second data in a partial region of said unit storage region, reading, from said disk, a fourth series of data after said corresponding data, and storing said fourth series of data in a spare region of said unit storage region, transmitting said second data to said host computer, reading, from said disk, a fifth series of data after said fourth series of data stored in said spare region of said unit storage region, and storing said fifth series of data in said partial region of said unit storage region, and reading, from said disk, a sixth series of data after said fifth series of data stored in said partial region of said unit storage region, and storing said sixth series of data in all other unit storage regions of said data transmission storage device.

11. the method of claim 10, said data transmission storage device comprising a buffer random-access-memory serving as a cache.

12. A disk drive, comprising:

a recording medium; and a data controller electrically connected to a host computer for controlling reading data from and writing data on said recording medium, and for controlling a read cache operation via a buffer memory comprising a plurality of segments, said data controller improving performance of the read cache operation by:

determining whether or not a size of data demanded by the host computer is smaller than the size of each segment of said buffer memory upon receipt of a data read command from the host computer;

when the size of the data demanded by the host computer is smaller than the size of each segment of said buffer memory, reading demanded data from said recording medium, and storing the demanded data in a partial region of a first segment of said buffer memory;

reading, from said recording medium, a first series of data after said demanded data, and temporarily storing said first series of data in a spare region of said first segment of said buffer memory;

reading the demanded data from said first segment of said buffer memory to said host computer;

reading, from said recording medium, a second series of data corresponding in size to said partial region of said first segment of said buffer memory after said first series of data stored in said spare region of said first segment of said buffer memory, and temporarily storing said second series of data in said partial region of said first segment of said buffer memory; and reading, from said recording medium, a third series of data after said second series of data stored in said partial region of said first segment of said buffer memory, and storing said third series of data in all other segments of said buffer memory.

13. The disk drive of claim 12, wherein said data controller further carries out the following functions:

when the size of the data demanded by the host computer is not smaller than the size of each segment of said buffer memory, reading from said recording medium first data corresponding in size to said first segment from the demanded data, temporarily storing said first data in said first segment of said buffer memory, and transmitting said first data to said host computer;

reading, from said recording medium, second data taken from the demanded data and exceeding in size each segment of said buffer memory, and temporarily storing said second data in a partial region of said first segment of said buffer memory;

reading, from said recording medium, a fourth series of data after said demanded data, and temporarily storing said fourth series of data in a spare region of said first segment of said buffer memory;

reading, from said first segment of said buffer memory, said second data for transmission to said host computer;

reading, from said recording medium, a fifth series of data after said fourth series of data stored in said spare region of said first segment of said buffer memory, and temporarily storing said fifth series of data in said partial region of said first segment of said buffer memory; and reading, from said recording medium, a sixth series of data after said fifth series of data stored in said partial region of said first segment of said buffer memory, and storing said sixth series of data in all other segments of said buffer memory.

* * * * *